Dec. 19, 1933. L. SUGERMAN Re. 19,028
TWIN SECTION EGG CARTON
Original Filed Oct. 14, 1927 2 Sheets-Sheet 1
Fig. 1
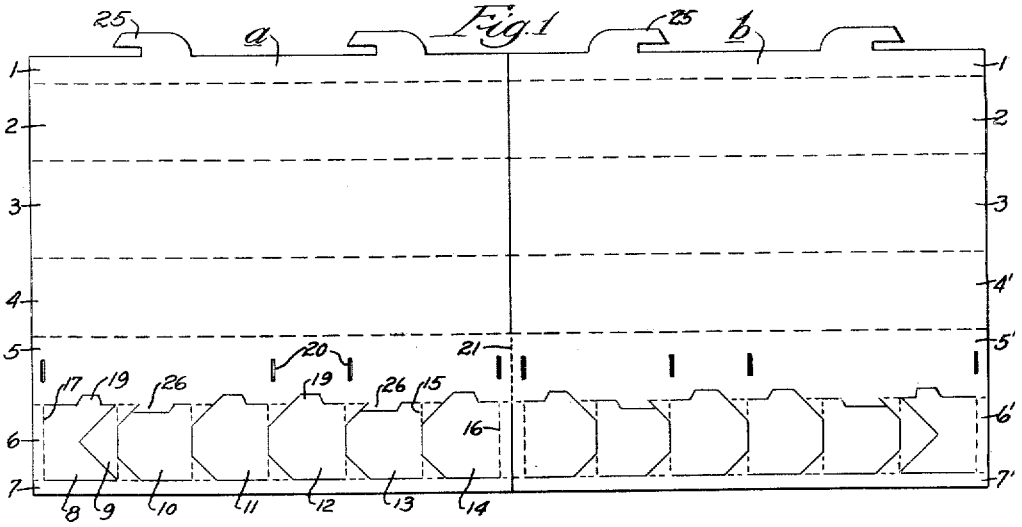
Fig. 3
Fig. 2
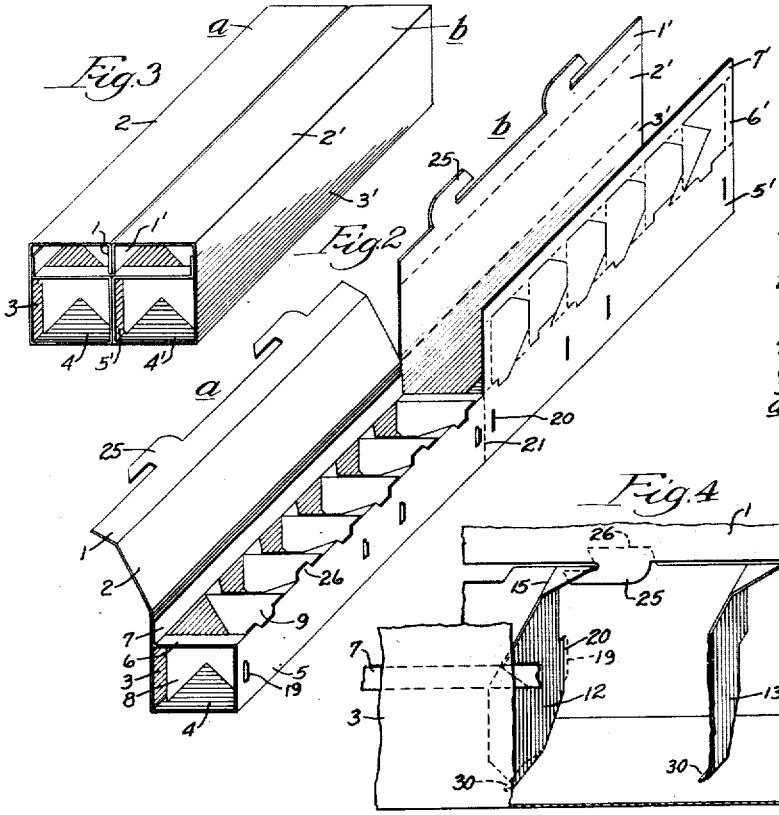
Fig. 5
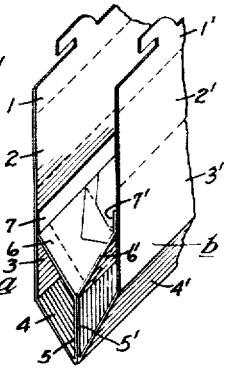
Fig. 4
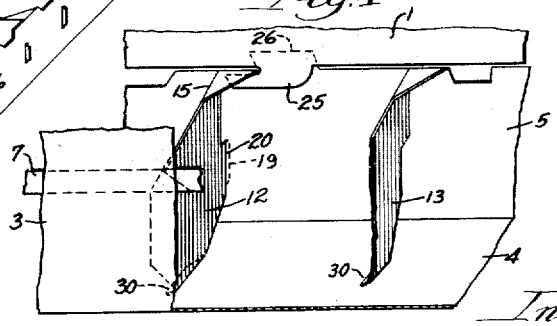
Inventor:
Louis Sugerman,
By Banning & Banning
Attys.

Dec. 19, 1933. L. SUGERMAN Re. 19,028

TWIN SECTION EGG CARTON

Original Filed Oct. 14, 1927 2 Sheets-Sheet 2

Inventor:
Louis Sugerman,
By Banning & Banning
Attys.

Reissued Dec. 19, 1933

Re. 19,028

UNITED STATES PATENT OFFICE 19,028

TWIN-SECTION EGG CARTON

Louis Sugerman, Chicago, Ill., assignor to Leon Benoit, Chicago, Ill.

Original No. 1,794,124, dated February 24, 1931, Serial No. 226,069, October 14, 1927. Application for reissue February 23, 1933. Serial No. 658,074

23 Claims. (Cl. 229—29)

This invention appertains to cartons for eggs and the like, and it is an object of the invention to provide a carton which shall be simple in construction, easy to assemble, and which shall hold the eggs safely against breakage.

Another object of this invention is to provide a carton separable into a plurality of sections, each of which is a complete unit, and wherein the carton, when empty, is collapsible for shipment.

The attainment of these and further objects will be apparent from the accompanying specification taken in conjunction with the drawings forming a part thereof.

In the drawings:

Figure 1 shows a blank piece of pasteboard from which the carton is made;

Fig. 2 is a view of the carton partly erected;

Fig. 3 is a view of the completed carton with its covers closed;

Fig. 4 is an enlarged fragmentary section showing the manner in which the carton covers are secured;

Fig. 5 is an enlarged fragmentary view showing the manner in which the carton is collapsed.

Figure 6:
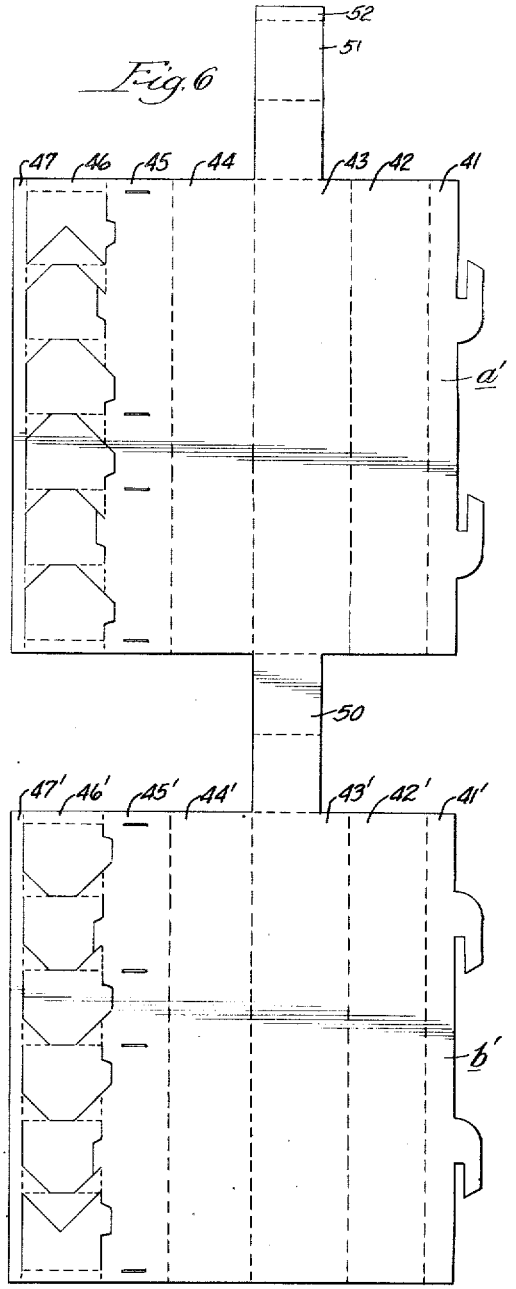
Figs. 6, 7, and 8 which illustrate a modified form of construction correspond generally, respectively, to Figs. 1, 2 and 3.

Referring now to Fig. 1, the general shape of the blank piece of paper, cardboard, pasteboard or the like, from which the carton is made, is shown. The dotted lines indicate the lines along which the blank is creased for folding, while the full lines indicate the lines along which the blank is cut. The portions into which one part *a* of the blank is divided have been numbered 1 to 7, the corresponding portions in a second part *b* of the blank being numbered 1′ to 7′, respectively. The two parts of the blank are integral in the portions 5—5′, but are cut apart elsewhere.

The blank part *a* is folded along the dotted lines following which the portion 7, which constitutes a securing strip, is pasted to one of the longitudinal sides formed from the blank portion 3. When so secured, the portion 6 forms an intermediate wall lying in a horizontal plane parallel to the plane of the portion 4 which forms one of the carton bottoms. The several portions of the blank *b* are similarly folded and secured. The two partially erected carton components are then folded along the dotted line 21 whereupon the portions 5 and 5′ are brought into adjacent relation opposite one another, their two opposite edges being pasted or glued together at their ends. The two components of the carton are thus securely held together with the portions 5—5′, constituting inner sides which together provide a longitudinal partition.

The intermediate walls formed from portions 6—6′ are divided into a number of transverse partitions 8 to 14 inclusive. By folding these partitions down at right angles to the plane of the paper along the dotted lines 15 transverse walls are provided which divide the interior of the carton into a number of cells. The partition 14 is folded along the line 16 and the partition 8 along the line 17. The partitions 8, 11, 12 and 14 each have a projection 19 which engages with a corresponding slit 20 when the partitions are folded down, thus serving to hold them in place and give the carton rigidity. The inner side walls 5—5′ each have two upwardly projecting tabs 26 one at each of the points where tongues 25 are to be passed under the triangular webs about which the partitions 9 and 12 fold. The object of these tabs is to facilitate closing of the carton, the tabs 26 directing the tongues 25 to their locking positions as may be seen in Fig. 4. The height of the partitions 10 to 14 slightly exceeds the height of the inner side wall 5 with the result that, when these partitions are folded down to position, the lower end of each partition is forced to give way and slightly bend, as may be seen at 30 in Fig. 4. Thus, certain of the partitions when folded, are additionally held in place by the frictional engagement of their bent lower edges with the bottom of the carton. A structure corresponding to that just described for the set-up portions of the blank parts *a* is produced also from the several portions of the part *b* of the same blank.

The complete carton, seen in Fig. 3, may be severed into two sections *a* and *b* by inserting a knife between the inner sides 5—5′ and cutting those walls at the line 21, and also at the opposite end of the sides 5—5′ where they are pasted together.

The assembled carton, with the intermediate wall 6—6′ in horizontal position may be collapsed for shipment by swinging the covers 2 and 2′ open into planes common with the corresponding sides 3—3′, and moving these walls together by folding down the bottoms 4—4′ and intermediate walls 6—6′, as partially shown in Fig. 5. It is, of course, understood that the carton is further collapsed from the position shown in Fig. 5 until the covers 2 and 2′ come together with the intermediate walls 6—6′ resting against the sides 3—3′, respectively.

Figure 8:
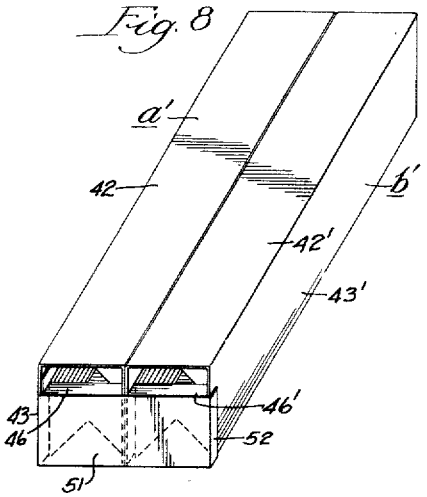
Figure 7:
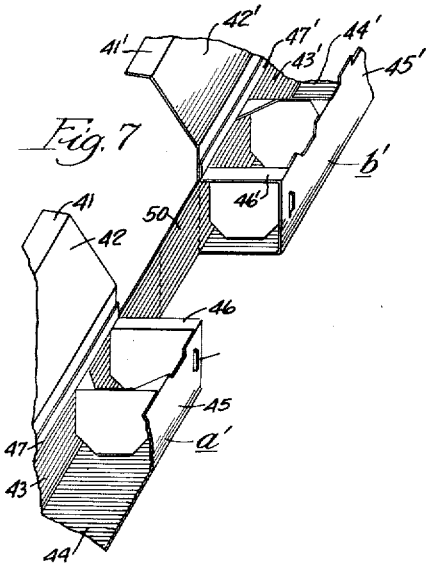

Referring now to Figs. 6, 7, and 8 showing a modified form of construction, the blank from which the carton is made is in two parts *a'* and *b'* integrally connected by a strap 50. The blank is divided by creases or score lines, the part *a* into a number of portions 41 to 47, and the part *b'* into a number of portions 41' to 47', which correspond, respectively, and are identical to, portions 1 to 7 and 1' to 7' of the carton previously described. The erection of the carton to the stage shown in Fig. 7 is identical to that shown in Fig. 2. To complete the erection of the carton, the blank parts *a'* and *b'* are folded around until the inner side walls 45 and 45' are in adjacent relation opposite each other, the strap 50 then constituting one of the ends which holds the two carton components together. The outer edge 52 of a second strap 51 which is integral with the outer carton side 43 is then pasted to the opposite side 43' to hold together the other ends of the two carton components. The straps 50 and 51 are not joined to the inner walls 45—45', hence the carton shown in Fig. 8 may be collapsed in the same manner as is the carton shown in Fig. 3. Upon collapsing the carton, as the outer sides 43 and 43' are brought together, the straps 50 and 51 fold outwardly at their respective centers.

To sever the carton shown in Fig. 8 into two sections, it is only necessary to cut the two ends, i. e., the straps 50 and 51, since these walls constitute the sole means for holding together the two carton components each of which, when severed from the other, becomes a cellular section complete in itself.

While in Figs. 2 and 7 the transverse partitions 8 to 14 are shown folded down, it is, of course, understood that this is for illustrative purposes only. In the process of erection of the carton, those partitions are not folded down until the inner sides 5—5' have been secured together, or until the strap edge 52 has been pasted to the outer wall 43'. The carton is completed, folded and shipped without the partitions 8 to 14 having been folded down. Those partitions are folded down when the eggs are to be put into the carton.

In compliance with the requirements of the patent statutes, I have herein described certain preferred embodiments of my invention. It is, however, to be understood that the same are shown for illustrative purposes only, and I do not wish to be limited to the precise construction shown.

I claim:

1. In combination, two paper egg carton components each a complete unit having a cover, a bottom and longitudinal sides, one of the longitudinal sides of one of the components being secured along opposite edges to a longitudinal side of the other component only along their vertical edges and by means located between the two longitudinal sides to form one combined carton, said combined carton being severable into its two component sections by severing said two longitudinal sides from one another.

2. In combination, two paper egg carton components each a complete unit having a cover, a bottom and longitudinal sides, one of the longitudinal sides of one of the components being directly secured only along two of its edges to the edges of a longitudinal side of the other component by means located between the two longitudinal sides to form one combined carton, said combined carton being severable into its two component sections.

3. In a carton, a longitudinal wall, transverse partitions hinged thereto adjacent the top of the wall and intermediate of the ends of the wall, a cover having a projecting lip adapted to lock beneath the hinged portion of the partition and the wall, and a guiding projection extending from the longitudinal wall towards the cover adjacent the hinged portion for guiding the lip beneath the hinged portion.

4. A cell carton comprising vertical front and rear walls, horizontal walls connecting, respectively, the upper and lower portions of said vertical walls, transverse cell partitions formed integrally from one of said horizontal walls and folded into said carton, certain of said transverse partitions each having an outward projection and being held in their folded positions by locking engagement of such projections with one of the other walls of the carton.

5. A cell carton comprising vertical front and rear walls, horizontal walls connecting, respectively, the upper and lower portions of said vertical walls, transverse cell partitions formed integrally from one of said horizontal walls and folded into said carton, and locking means comprising projections on certain of said transverse partitions and cooperating with one of the vertical walls for locking such transverse partitions in their folded positions.

6. A cellular carton having top and bottom walls and an intermediate wall between the two, said intermediate wall being divided into a number of partitions equal to the number of cells comprising the carton, all but one of the partitions being similar and folded towards the bottom wall each to form one wall of the cells, said one partition being cut in two and both portions being folded towards the bottom wall in opposite directions to constitute two separate cell walls.

7. A carton comprising front, rear, bottom and top walls, an intermediate wall between the top and bottom walls, partitions struck from the intermediate wall and adapted to be pushed into the carton transversely thereof towards the bottom wall to divide the carton into a plurality of cells, said partitions being longer than the distance between the intermediate wall and the bottom wall, the excess portion being folded along the bottom and being held in position by frictional engagement therewith.

8. In a carton, a longitudinal wall, transverse partitions adjacent the top of the wall hinged thereto by horizontally extending means, a cover having projecting lips adapted to lock beneath the hinge means, and guiding projections extended lengthwise in the plane of the wall adjacent the hinge means and projecting from the top thereof toward the cover for guiding the lips beneath the hinge means.

9. In a carton, a pair of connected spaced longitudinal walls having transverse partitions extending therebetween, means providing a horizontal hinged connection between each partition and the two walls adjacent the tops thereof, a cover hinged to one wall and provided along its free edge with a projecting lip adapted to lock beneath one of the hinge means adjacent the other wall, and a guiding projection extended lengthwise of the wall last named in the plane thereof adjacent one of the hinge means and projecting from the top of the wall for guiding the lip to locking position beneath the hinge means.

10. In a carton of the type having front and rear walls, the rear wall being of a greater height than the front wall and having connected thereto a cover provided with a projecting lip with locking parts adapted to engage with coacting parts adjacent the front wall, said projecting lip exclusive of the locking parts being of a width equal to the difference in height of the front and rear walls, said carton having also a wall formed integrally with the front wall and secured along its edge to the rear wall and providing a partition forming strip the partitions of which when turned down form transverse walls, and locking means to secure the transverse walls in down position comprising edge projections on said transverse walls, one of the carton walls having slits for receiving said projections.

11. A carton having front and rear longitudinal walls, the front wall being of a lesser height from the bottom of the carton than is the rear wall, a cover formed integrally with the rear wall and having a strip extending downwardly towards the front wall, an intermediate wall integral with the front wall and spaced beneath the cover by an amount substantially equal to the difference in height of the front and rear vertical walls, cell forming partitions struck from said intermediate wall and foldable into the carton to extend transversely thereof and divide the carton into a number of cells, at least one of the cell forming partitions having locking projections cooperating with slits formed in an adjacent wall of the carton, said downwardly extending strip having locking hooks for locking the cover to said intermediate wall, and said front wall having guiding projections lying in the plane thereof for guiding the hooks into locking position.

12. A collapsible egg holder comprising a slotted blank foldable along longitudinal lines to provide a cover, a bottom, and side walls, and a horizontal wall connecting the side walls at points spaced from the bottom, said horizontal wall having a series of transverse partitions foldable into the holder to engage the side and bottom walls to provide cells, edge means on said transverse partitions engageable with slots in the blank to lock said partitions in folded position, locking means on the free end of said cover engageable with portions of the horizontal wall to retain said cover down over the cells, and an upstanding tab on one of the side walls to guide said locking means to locking engagement with the horizontal wall.

13. A one-piece carton formed from a blank which is foldable along parallel lines to produce connected walls providing a locking strip, a cover, a rear wall, a bottom, a front wall, an upper horizontal wall, and a securing strip in the order named, the horizontal wall being cut at intervals along the juncture with the adjacent wall and therebetween to provide a series of transversely foldable partitions adapted when the carton is set up to constitute vertical transverse walls between the front and rear walls, the cuts defining the partitions being arranged so as to form the latter narrower towards their free ends to provide projections extending upwardly in the plane of the front wall and triangular members connecting the partitions with the front and rear walls, certain of the triangular members connecting the partitions with the front wall cooperating with the locking strip to secure the cover in closed position over the carton, and the upstanding projection of the front wall serving to guide said strip to locking position.

14. A one-piece carton formed from a blank which is foldable along parallel lines to produce connected walls providing a locking strip, a cover, a rear wall, a bottom, a front wall, an upper horizontal wall, and a securing strip in the order named, the horizontal wall being cut at intervals along the juncture with the adjacent walls and therebetween to provide a series of transversely foldable partitions adapted, when the carton is set up, to constitute vertical transverse walls between the front and rear walls, the cuts defining the partitions being arranged so as to form the latter narrower towards their free ends to provide projections extending upwardly in the plane of the front wall and means connecting the partitions with the front and rear walls, certain of the means connecting the partitions with the front wall cooperating with the locking strip to secure the cover in closed position over the carton, and the upstanding projection of the front wall serving to guide said strip to locking position.

15. In a carton of the type having front and rear walls, a cover connected to the rear wall, a locking strip with interlocking parts on the cover, and having also a partition-forming wall integrally formed with the front wall, the partitions of which, when turned down, form transverse walls, a horizontal triangular piece uniting a transverse wall at its top with the front wall, the transverse wall being severed from the front wall by an angular slit which approaches the vertical center of the transverse wall, whereby the transverse wall is narrowed towards its lower end and the front wall is provided with an upwardly extending projection for the purpose set forth.

16. In combination, two paper egg carton components each a complete unit having a cover, a bottom, and longitudinal sides, means for securing the two components together to form one combined carton, said means comprising a transverse strap integral with one of the longitudinal walls of one of the components secured to a longitudinal wall of the other component, said strap constituting a transverse wall of the combined carton, said combined carton being severable into its component sections by severing said strap.

17. In combination, two paper egg carton components each a complete unit having a cover, a bottom, and longitudinal sides, means for securing the two components together to form one combined carton, said means comprising a transverse strap integral with one of the longitudinal walls of each of the two components, said strap constituting a transverse wall of the combined carton, said combined carton being severable into its component sections by severing said strap.

18. A paper carton consisting of two individually complete components, said carton having a cover, a bottom, and four vertical walls comprising longitudinal sides and transverse ends, the vertical walls of the carton being joined to form a continuous band, said carton being severable into its two component sections by severing the band along vertical lines at two of the opposite ends, each section having a transverse wall at the two ends thereof independently of the two first mentioned transverse walls.

19. In a carton of the type having front and rear walls, a cover connected to the rear wall, a projecting lip with interlocking parts on the cover, a partition-forming strip integrally formed with the front wall, the partitions of which, when turned down between the front and rear walls, form transverse walls, horizontal pieces uniting said transverse walls at their tops with the front wall and providing means to receive the interlocking parts on the projecting lip, and locking means to secure said transverse walls in down position, comprising edge projections on said walls, one of the carton walls being slotted to receive said projections.

20. The method of forming a carton, which comprises blanking a strip of paper to form front and rear wall forming portions and a partition-forming wall integral with the front wall, folding the partition-forming wall towards the rear wall and securing the edge thereof to the rear wall, folding the partitions downward towards the bottom of the carton to form a plurality of cells, and passing an edge projection on the partitions into a slit in an adjacent wall of the carton.

21. In combination, two carton components arranged side by side immovably one with respect to the other, each component being a complete carton unit with longitudinal walls constituting opposite sides, and means for securing the components together to form one combined carton comprising a strap extended from the outer side of one component across the end thereof and of the other component to the outer side thereof forming an end wall for the combined carton, the strap being joined integrally to at least one of the two sides between which it is so extended, said combined carton being severable into two sections by severing the strap.

22. In combination, two carton components arranged side by side immovably one with respect to the other, each component being a complete carton with longitudinal walls constituting opposite sides, cross walls dividing the carton into cells and the two inner sides being formed between their ends for interlocking engagement with said cross walls, said sides being connected at their ends and free intermediate such points of connection to form one combined carton, one connection comprising a vertical fold joining said sides, said combined carton being severable into two like sections by severing the juncture of one inner side with the other along the vertical fold line at one end thereof.

23. In combination, two carton components arranged side by side immovably one with respect to the other, each component being a complete carton with longitudinal walls constituting opposite sides, and an integral connection between the two components at one end of the carton extending from one side of one component to a corresponding side of the other, the two components of the combined carton being severable into two sections by severing said connection between the sides joined thereby.

LOUIS SUGERMAN.

DISCLAIMER

Re. No. 19,028.—*Louis Sugerman*, Chicago, Ill. TWIN-SECTION EGG CARTON. Patent dated December 19, 1933. Disclaimer filed February 21, 1939, by the assignee, *Leon Benoit;* the patentee concurring.

Hereby enters this disclaimer as to claims 6, 10, and 19.

[*Official Gazette March 21, 1939.*]